April 21, 1959
E. SCHNABEL
2,883,513
HEATED HOSE ASSEMBLY
Filed Nov. 21, 1957
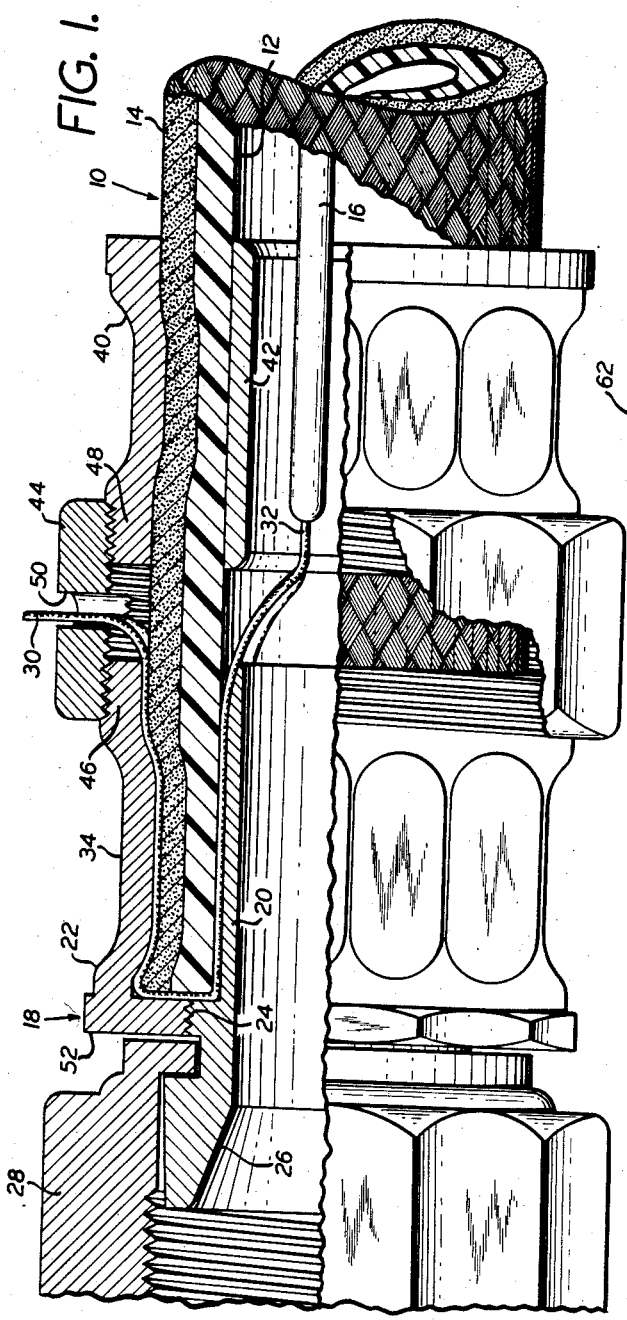
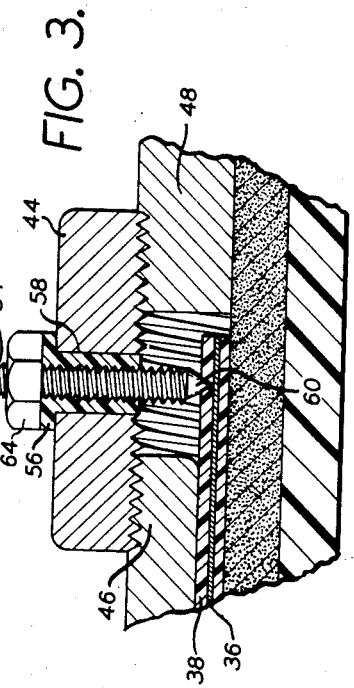
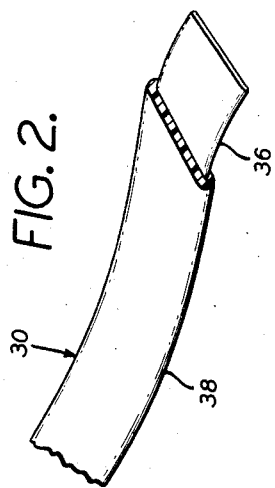
INVENTOR
ERNST SCHNABEL
BY
Byerly, Townsend, Watson & Churchill
ATTORNEYS.

2,883,513

HEATED HOSE ASSEMBLY

Ernst Schnabel, Limburg (Lahn), Germany, assignor to Resistoflex Corporation, Roseland, N.J., a corporation of New York Application November 21, 1957, Serial No. 697,952

6 Claims. (Cl. 219—46)

The present invention relates to a hose assembly provided with electrical heating means.

It is often necessary when conveying fluids through flexible tubes or hoses to maintain the fluids at an elevated temperature. Heretofore numerous attempts have been made to provide a heated hose, and these attempts have taken the form of external heating elements or heating coils, or the like. Double-walled hoses have also been employed whereby a heating fluid can be circulated between the walls. Heating arrangements of this type have the drawback that the heat must pass through the walls of the hose, which walls, particularly in the case of rubber, synthetic materials, or the like, often act as heat barriers or else are not able to withstand the temperatures.

If it could be possible to directly heat the medium flowing through the hose or tube, that is, to accomplish the heating by means of internal heating conductors, strips, wires or other elements, the advantages would be considerable. The problem, however, is to provide an electrical connection between the internal heating elements and the external source of power which connection is suitably insulated and properly fluid sealed. With hose or tubing which is reinforced with metal, for example, reinforced with an external covering of braided wire, the problem of achieving an insulated and a fluid-tight connection becomes more serious.

In accordance with the present invention, however, a solution for the above problem is obtained by providing a hose assembly with an internal electrical heating element comprising a flexible hose of metal reinforced non-metallic material, an electrical heating element disposed within said hose and extending throughout its length, an end fitting for the hose having a nipple and a socket concentrically disposed within and without the end of said hose, respectively, at an end thereof, and an insulated flexible metal lead-in connected at one end to said heating element and passing outwardly between said nipple and the inner surface of said hose and back over the outer surface of said hose between the hose and said socket such that an external electrical connection can be made to the other end of said lead-in, said nipple and said socket compressing the end of said hose and said lead-in therebetween so as to effect a fluid-tight seal between the end fitting and the hose.

Thus, if the path which the lead-in follows between the hose and the nipple and socket is made sufficiently long, sufficient compressive forces can be set up in the end of the hose by the nipple and socket to develop a seal adequate for low or moderate fluid pressure operation. The compressive forces developed between the socket and nipple must be maintained at a moderate value in order not to impair or destroy the insulation about the lead-in. Excessive forces of assembly will actually cause the end fitting to become leaky.

In order to render the assembly suitable for use with elevated fluid pressures which might blow off the end fitting mentioned above, a further aspect of the invention provides: a pair of concentrically disposed sleeves securely embracing the hose therebetween adjacent but spaced from the nipple and socket, and coupling means coupling the socket to the outermost of the pair of sleeves to prevent axial movement therebetween. The lead-in is now passed through the innermost of the pair of sleeves before entering between the nipple and the inner surface of the hose, and is kept flexible at least where it passes between the hose and the nipple and the socket. It is passed out through the coupling means for enabling external electrical connection to be made thereto. As a result, the pair of sleeves can embrace the hose with greater force than the nipple and socket to prevent thereby blow-off of the end fitting.

The invention will be understood better after reading the following detailed description with reference to the accompanying drawings in which:

Fig. 1 is a fragmentary longitudinal view with parts broken away and in section of an end of a hose assembly illustrating an embodiment of the invention;

Fig. 2 is an enlarged fragmentary perspective view partially sectioned and showing an insulated flexible metal lead-in for use in the embodiment of Fig. 1; and Fig. 3 is an enlarged fragmentary view in section of a modification of the assembly of Fig. 1.

Reference should now be had to Fig. 1 of the drawings wherein a fitting is shown assembled to the end of a flexible hose in accordance with the present invention. The hose is designated generally by the reference numeral 10 and consists of non-metallic material 12 reinforced with a metallic armor 14. As shown in the drawing, the armor 14 may take the form of a wire braid covering. The material 12 may be rubber, a synthetic substance, or the like.

An electrical heating element, shown diagrammatically at 16, is disposed within the hose 10 and may extend throughout its length or throughout a substantial part thereof. The hose 10 is provided with an end fitting 18 having a nipple 20 and a socket 22. The socket 22 is arranged concentrically about the shank of the nipple and may be threadedly secured to the nipple at 24. The nipple shank is disposed within while the socket is disposed without the end of the hose. The nipple 20 is provided at the end remote from the hose with a conventional seat 26 and flanged nut 28 for detachably securing the assembly to a mating part.

An insulated flexible metal lead-in 30 is connected at one end 32, in any convenient manner, to the heating element 16. The details of the lead-in 30 will be described further hereinafter with reference to Fig. 2. As seen in Fig. 1, however, the lead-in 30 passes outwardly between the shank of the nipple 20 and the inner surface of the hose 10 and back over the outer surface (over the braid 14) of the hose between the hose and the socket 22. As seen in the drawing, the socket 22 has been contracted radially in the region 34 by means of radial dies so as to compress the lead-in 30 and the hose 10 against the nipple 20. Other contracting means may be employed. Although not shown in the drawings, the surfaces of the socket 22 and the nipple 20 which come in contact with the lead-in 30 should be coated with a heat-resistant pressure-resistant insulating lacquer or synthetic material prior to assembly such that the lead-in 30 will be embedded therein upon assembly. A typical coating may consist of partially polymerized epoxy resin having a thickness from 0.1 to 1 mm. (.004 to .04″).

As shown in Fig. 2 the lead-in 30 may be formed from a very thin flexible strip 36 of a metal such as brass. In a typical assembly the strip 36 can have a thickness of 0.2 mm. (.008″). It is insulated by a sheath 38 of a fluorocarbon resin such as polytetrafluoroethylene or trifluoroethylene. The sheath 38 may be formed from a flattened piece of tubing having a wall thickness of about 0.3 mm. (.012"). The complete assembly of the lead-in must be such that when it is compressed between the socket 22 and nipple 20 of Fig. 1 it will become embedded in the previously noted coatings of lacquer or synthetic material to the extent that a fluid-tight leak-proof seal is obtained. By way of example, the hose 10 in Fig. 1 may have an inside diameter of 16 mm. (.63") and the lead-in 30 may be formed of a brass strip having a width of 10 mm. (.39") and a thickness as mentioned above. The fluorocarbon sheath may have a width of 14 mm. (.55") and a wall thickness as noted above. As described so far the assembly will be found adequate for low operating pressures where the problem of separation of the hose from the fitting is not present. It should be apparent that a source of current can be connected to the external free end of the lead-in 30 and to a similar connection at the other end of the heating element 16 in order to energize the same.

In order to adapt the assembly for higher operating pressures there is provided additionally a pair of concentrically disposed sleeves 40 and 42, as seen in Fig. 1, which securely embrace the hose 10 therebetween adjacent to but spaced from the nipple 20 and the socket 22. As shown in the drawings the outermost sleeve 40 may be contracted by radial dies, or the like, in order to compress the hose 10 against the innermost sleeve 42. Coupling means in the form of an internally threaded ring 44 threadedly engages a threaded portion 46 on the socket 22 and a threaded portion 48 on the outermost sleeve 40. The ring 44 may be provided with a slot 50 through which the lead-in 30 is passed. It should be noted from the drawings that the radial contraction of the socket 22 and the sleeve 40 is so arranged as not to deform or distort the threaded sections of these members. By coupling the socket to the outermost sleeve axial movement therebetween is precluded.

It can be observed from the drawings that neither the heating element nor the lead-in 30 is included between the pair of sleeves 40 and 42. As a result these members can be caused to develop a much greater degree of compression upon, and thus more securely embrace, the hose 10. In this manner blow-off of the end fitting comprising the nipple 20 and the socket 22 is precluded by the anchor provided by the sleeves 40 and 42. The sleeves should be spaced from the nipple and socket a sufficient distance, however, to permit the lead-in to pass through the gap therebetween as clearly shown in the drawing.

In Fig. 1 all of the parts which embrace the hose, such as the elements 20, 22, 40 and 42, are shown to have smooth bores or outer surfaces. With respect to the nipple 20 and socket 22 this is essential in order to avoid piercing or otherwise damaging the insulation surrounding the lead-in 30. However, a similar restriction does not apply to the sleeves 40 and 42, and they may be provided in known manner with grooved or ribbed surfaces for increasing the grip upon the hose. Although the lead-in 30 has been described as consisting of a thin metal strip it is also possible to employ a thin braid or thin wires and the like. Likewise, the threaded ring 44 may be replaced by a brazed or welded ring or by a webbed structure or the equivalent.

In assembling the structure of Fig. 1, the sleeves 40 and 42 can be secured first to the hose 10 at a predetermined distance from the end thereof. Next, the ring 44 is passed over the end of the hose and screwed onto the outer sleeve 40. The heating element 16 with the lead-in 30 attached thereto is inserted in the hose and the lead-in is folded over the end of the hose, as shown, and passed through the slot 50 in the ring 44. Now the socket 22 can be slipped over the end of the hose and screwed into the ring 44 until a rear flange 52 on the socket compresses the bight of the lead-in against the extreme end of the hose. It is to be understood that the socket is still in its uncontracted condition and, therefore, has an internal diameter commensurate with the external diameter of the hose. With the socket in place a conventional adaptor can be screwed into the flanged nut 28 to facilitate insertion of the nipple 20. The nipple can then be urged into the hose until it threadedly engages the socket at 24. Now a suitable mandrel may be inserted in the nipple and the radial dies applied to the exterior of the socket in order to develop the desired degree of contraction. This completes the assembly.

Instead of bringing the flexible portion of the lead-in 30 through a slot in the ring 44 it may be preferable to provide, as seen in Fig. 3, the ring 44 with a threaded binding post 54 which serves as a rigid continuation of the lead-in for establishing electrical connection thereto. The binding post 54 may be threadedly supported in an insulating bushing 56 which has been previously staked or otherwise secured in an aperture 58 through the wall of the ring 44. The inner end of the post 54 may be provided with a sharp point 60 for piercing the fluorocarbon sheath 38 so as to engage the conductive strip 36. The binding post 54 may be provided with a screwdriver slot at its upper end 62 by means of which it can be urged into contact with the flexible portion of the lead-in. A jam nut 64 may be applied to the binding post and screwed down upon the bushing. A clamping nut 66, also applied to the binding post, can be used to secure an electrical terminal thereto.

In assembling the modification of Fig. 3, the sequence of operations can be the same as with the Fig. 1 embodiment with the additional step of inserting the binding post to engage the flexible portion of the lead-in prior to the step of assembling the socket 22.

It will be understood from the foregoing description that the invention is susceptible of modification and variation as will appear to those skilled in the art involved.

What I claim is:

1. A hose assembly with an internal electrical heating element comprising a flexible hose of metal reinforced non-metallic material, an electrical heating element disposed within said hose and extending throughout its length, an end fitting for the hose having a nipple and a socket concentrically disposed within and without the end of said hose, respectively, at an end thereof, and an insulated flexible metal lead-in connected at one end to said heating element and passing outwardly between said nipple and the inner surface of said hose and back over the outer surface of said hose between the hose and said socket such that an external electrical connection can be made to the other end of said lead-in, said nipple and said socket compressing the end of said hose and said lead-in therebetween so as to effect a fluid tight seal between the end fitting and the hose.

2. A hose assembly according to claim 1, wherein said lead-in where it passes between the hose and the end fitting is insulated by a sheath of fluorocarbon resin embedded in a thin layer of epoxy resin.

3. A hose assembly according to claim 1, wherein said lead-in where it passes between the hose and the end fitting is insulated by a sheath of fluorocarbon resin embedded in a thin layer of insulating lacquer.

4. A hose assembly with an internal electrical heating element comprising a flexible hose of metal resinforced non-metallic material, an electrical heating element disposed within said hose and extending throughout its length, an end fitting for the hose having a nipple and a socket concentrically disposed within and without the end of said hose, respectively, at an end thereof, a pair of concentrically disposed sleeves securely embracing said hose therebetween adjacent but spaced from said nipple and socket, coupling means coupling said socket to the outermost of said pair of sleeves to prevent axial movement therebetween, and an insulated metal lead-in connected at one end to said heating element and passing outwardly through the innermost of said pair of sleeves between said nipple and the inner surface of said hose and back over the outer surface of said hose between the hose and said socket into the space between said socket and said outermost sleeve and out through said coupling means such that an external electrical connection can be made to the other end of said lead-in, said lead-in being flexible at least where it passes between the hose and said nipple and socket, said nipple and socket compressing the end of said hose and said lead-in therebetween so as to effect a fluid-tight seal between the end fitting and the hose, whereby said pair of sleeves can embrace said hose with greater force than said nipple and socket due to the presence of the lead-in and blow-off of the end fitting under elevated operating fluid pressures is precluded.

5. A hose assembly according to claim 4, wherein said coupling means comprises an internally threaded ring threadedly engaging external threads on confronting ends of said socket and said outermost sleeve, and wherein said lead-in includes a rigid metallic binding post carried by said ring but insulated therefrom and making electrical contact with the flexible portion of said lead-in in said space between the socket and the outermost sleeve.

6. A hose assembly according to claim 4, wherein said coupling means comprises an internally threaded ring threadedly engaging external threads on confronting ends of said socket and said outermost sleeve, and wherein the flexible portion of said lead-in extends in insulated fashion through an aperture in said ring.

References Cited in the file of this patent

UNITED STATES PATENTS

| | | |
|---|---|---|
| 1,980,389 | Dennie | Nov. 13, 1934 |
| 2,479,483 | Ekleberry | Aug. 16, 1949 |
| 2,520,501 | Guiler et al. | Aug. 29, 1950 |
| 2,521,822 | Boswell | Sept. 12, 1950 |
| 2,758,194 | Heron | Aug. 7, 1956 |
| 2,805,399 | Leeper | Sept. 3, 1957 |